US010142508B2

(12) United States Patent
Matsuda (10) Patent No.: US 10,142,508 B2
(45) Date of Patent: Nov. 27, 2018

(54) BATTERY-POWERED PRINTER, POS SYSTEM, AND METHOD FOR PRINTING WITH BATTERY-POWERED PRINTER

(71) Applicant: TOSHIBA TEC KABUSHIKI KAISHA, Tokyo (JP)

(72) Inventor: Okiharu Matsuda, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/686,364

(22) Filed: Aug. 25, 2017

(65) Prior Publication Data
US 2018/0167530 A1 Jun. 14, 2018

(30) Foreign Application Priority Data

Dec. 14, 2016 (JP) ................................. 2016-242591

(51) Int. Cl.
*B41J 29/13* (2006.01)
*H04N 1/00* (2006.01)
(Continued)

(52) U.S. Cl.
CPC .......... *H04N 1/00976* (2013.01); *B41J 2/355* (2013.01); *B41J 2/3558* (2013.01);
(Continued)

(58) Field of Classification Search
CPC . B41J 2/355; B41J 2/3558; B41J 2/365; B41J 3/36; B41J 11/42; B41J 15/04; B41J 29/13
See application file for complete search history.

(56) References Cited

U.S. PATENT DOCUMENTS 5,741,079 A * 4/1998 Hayama ................... B41J 2/365
347/191
6,106,176 A 8/2000 Yanagisawa et al.
(Continued)

FOREIGN PATENT DOCUMENTS

EP 0255116 A2 2/1988
EP 0943447 A1 9/1999
(Continued)

OTHER PUBLICATIONS

Extended European Search Report dated May 30, 2018, mailed in counterpart European Application No. 17204908.2, 9 pages.

*Primary Examiner* — Lamson Nguyen
(74) *Attorney, Agent, or Firm* — Patterson & Sheridan, LLP (57) ABSTRACT

A battery-powered printer includes a printing head that has a plurality of heat generating elements arranged along a direction orthogonal to a transport direction of a recording medium and is configured to print on the recording medium, a temperature sensor configured to measure a temperature within the printer, and a processor configured to determine whether the temperature measured by the temperature sensor is equal to or lower than a predetermined threshold, determine a constant printing speed at the time of printing under a condition where the temperature is equal to or lower than the predetermined threshold, and control the printing head and a transporting speed of the recording medium so as to cause each line of the print data to be printed on the recording medium at the constant printing speed.

20 Claims, 5 Drawing Sheets

(51) Int. Cl.
  *G06K 15/02*   (2006.01)
  *B41J 2/355*   (2006.01)
  *B41J 15/04*   (2006.01)
  *B41J 2/365*   (2006.01)
  *B41J 3/36*    (2006.01)
  *B41J 11/42*   (2006.01)
  *B41J 29/393*  (2006.01)
  *B41J 29/38*   (2006.01)

(52) U.S. Cl.
  CPC ............. *B41J 2/365* (2013.01); *B41J 3/36* (2013.01); *B41J 11/42* (2013.01); *B41J 15/04* (2013.01); *B41J 29/13* (2013.01); *B41J 29/38* (2013.01); *B41J 29/393* (2013.01); *G06K 15/028* (2013.01); *H04N 1/00899* (2013.01); *H04N 1/00907* (2013.01); *H04N 2201/0082* (2013.01)

(56) References Cited

U.S. PATENT DOCUMENTS

| | | | |
|---|---|---|---|
| 6,297,841 B1* | 10/2001 | Takeda | B41J 2/365 |
| | | | 347/186 |
| 8,379,069 B2 | 2/2013 | Tamura et al. | |
| 2011/0318080 A1* | 12/2011 | Hatanaka | B41J 3/4075 |
| | | | 400/582 |
| 2016/0001574 A1 | 1/2016 | Ishino et al. | |

FOREIGN PATENT DOCUMENTS

| | | |
|---|---|---|
| JP | 2005132063 A | 5/2005 |
| JP | 2009160809 A | 7/2009 |

* cited by examiner

BATTERY-POWERED PRINTER, POS SYSTEM, AND METHOD FOR PRINTING WITH BATTERY-POWERED PRINTER

CROSS-REFERENCE TO RELATED APPLICATION

This application is based upon and claims the benefit of priority from Japanese Patent Application No. 2016-242591, filed Dec. 14, 2016, the entire contents of which are incorporated herein by reference.

FIELD

Embodiments described herein relate generally to a battery-powered printer.

BACKGROUND

In the related art, there is a thermal printer that prints on heat sensitive paper by heat generation from a thermal head. In the thermal printer, when temperature around the thermal head decreases, even if heat is applied to the heat sensitive paper, since the thermal head is cooled by its surroundings, the printing result may be of low printing density or blurred. Accordingly, in the related art, in order to improve printing quality in low temperature environments, the width of an electric power pulse output to the thermal head is increased by decreasing the transporting speed of a recording paper.

In addition, the above-described thermal printer may be a portable type printer using a battery as a driving power source. In such a battery-driven printer, electric power that can be supplied at one time is limited. Therefore, in such a device, heat generating elements making up the thermal head is driven in a time division manner, in accordance with a printing coverage for each line. In particular, the transporting speed of the thermal head is changed according to the printing coverage. Thus, as the printing coverage increases, the number of time divisions for driving the thermal head increases, and thereby the transporting speed of the recording paper, that is, the printing speed, decreases.

In addition, because the battery-driven printer is portable, it can be used in various environments such as low temperature environments. Since the electric power that can be supplied to the thermal head is limited, the above-described time division technique cannot be applied as is to the battery-driven printer. Specifically, since an amount of electric power used increases as the time width of the electric power pulse increases, it is necessary to further increase the number of time divisions for driving thermal head. As a result, the transporting speed of the recording paper further decreases. When the transporting speed of the recording paper decreases too much, there is a possibility that the printing quality deteriorates, because clogging or the like might occur as a result of the rotation speed of a drive motor, such as a stepping motor, decreasing below the minimum rotation speed required for stable rotation.

DETAILED DESCRIPTION

Embodiments provide a battery-powered printer and a program capable of improving printing quality in low-temperature environments.

In general, according to one embodiment, there is provided a battery-powered printer that includes a printing head that has a plurality of heat generating elements arranged along a direction orthogonal to a transport direction of a recording medium and is configured to print on the recording medium, a temperature sensor configured to measure a temperature within the printer, and a processor configured to determine whether the temperature measured by the temperature sensor is equal to or lower than a predetermined threshold, determine a constant printing speed at the time of printing under a condition where the temperature is equal to or lower than the predetermined threshold, and control the printing head and a transporting speed of the recording medium so as to cause each line of the print data to be printed on the recording medium at the constant printing speed.

Hereinafter, an embodiment of a printer and a program will be described in detail with reference to the accompanying drawings. The embodiment which will be described below is one embodiment of the printer and the program, and does not limit a configuration, specifications, or the like thereof.

Figure 1:
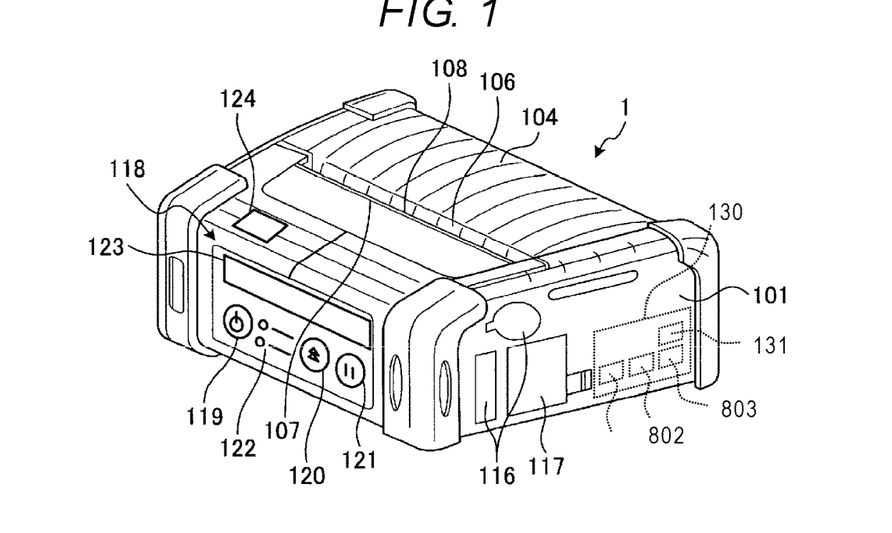
FIG. 1 is a perspective view of a printer according to an embodiment.
Figure 2:
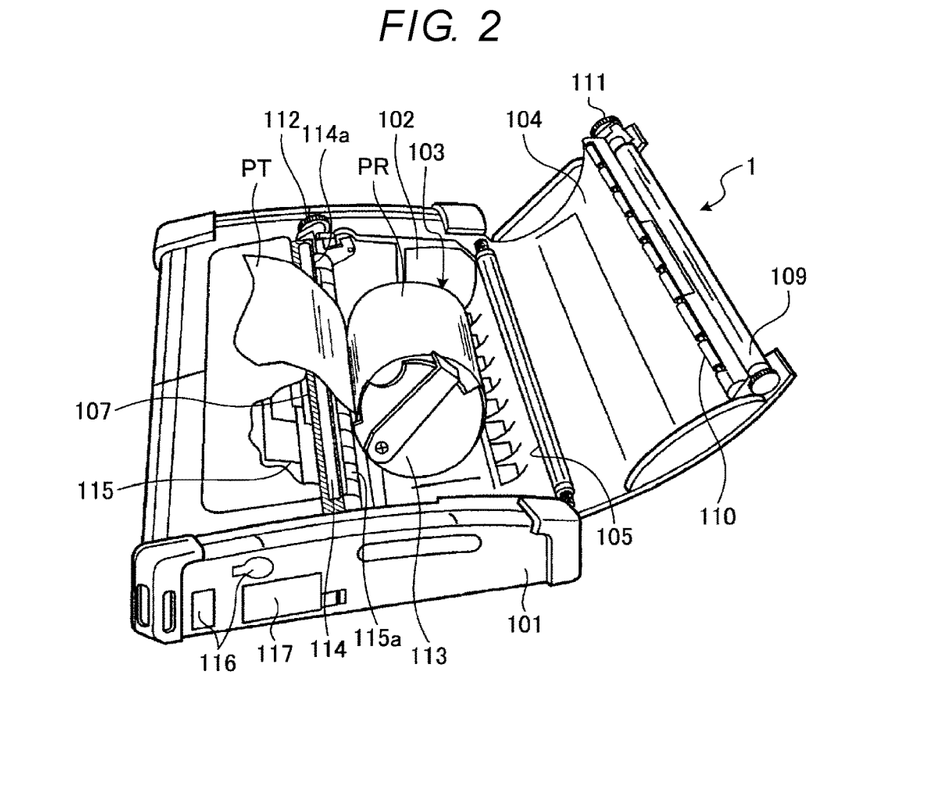
FIG. 2 is a perspective view of the printer in a state where a cover is open.

FIG. 1 is a perspective view showing an appearance of a printer 1 according to the embodiment. FIG. 2 is a perspective view showing the appearance of the printer 1 in a state where a cover 104 (described later) is open.

The printer 1 includes a rectangular parallelepiped housing 101. The housing 101 includes an internal structure for accommodating a paper roll PR on which a paper PT as a medium to be printed is wound. An opening portion 102 is formed on an upper surface of the housing 101 so as to accommodate the paper roll PR within the housing 101. In addition, a paper accommodating unit 103 capable of detachably accommodating the paper roll PR is formed inside the housing 101. Here, for example, the paper PT is a heat sensitive paper, a label sheet in which a plurality of labels formed of a heat sensitive paper are attached to a non-heat sensitive paper, or the like.

The opening portion 102 becomes an open state or a closed state by opening and closing the cover 104 rotatably provided. The cover 104 is rotatably attached to a back side edge 105 of the housing 101. The back side edge 105 forms one side portion of the edge of the opening portion 102. In a state where the cover 104 is closed, a paper discharging outlet 108 for drawing out the printed paper PT is formed between an outer side 106 and a front side edge 107 of the housing 101. The outer side 106 forms a front tip portion of the cover 104. The front side edge 107 of the housing 101 forms one side of the opening portion 102.

In addition, the cover 104 includes a platen roller 109, paper press rollers 110, and a driven gear 111. The platen roller 109 is provided at a position in contact with a line thermal head 114 within a housing 101 in a state where the cover 104 is closed. The paper press rollers 110 are provided in the vicinity of the platen roller 109, and contact with the head cover 115a in the state where the cover 104 is closed. Both of the platen roller 109 and the paper press rollers 110 are rotatable about a width direction of the printer 1 as a rotation axis.

The driven gear 111 that rotates integrally with the platen roller 109 is provided on one end side of the platen roller 109. In addition, a drive gear 112 is provided at a position corresponding to the driven gear 111 inside the housing 101. The driven gear 111 meshes with the drive gear 112 in the state where the cover 104 is closed. The drive gear 112 rotates by using a stepping motor 126 (see FIG. 3 and FIG. 4) as the driving power source. Accordingly, the driven gear 111 is driven by the drive gear 112 and thereby rotationally drives the platen roller 109 connected to the driven gear 111. In the embodiment, the driven gear 111 and the drive gear 112 configure a transmission 128 (see FIG. 4) which will be described below.

The paper roll PR is accommodated in the paper accommodating unit 103 in a state where a roll axis is parallel to the width direction of the printer 1. The paper PT of the paper roll PR is drawn out by a rotation of the platen roller 109, and transported in a direction (sub-scanning direction) of the paper discharging outlet 108. In this embodiment, the paper roll PR is accommodated detachably between a pair of guide fences 113 inside the paper accommodating unit 103.

The line thermal head 114 is disposed at a position corresponding to the platen roller 109 inside the housing 101. The line thermal head 114 faces the platen roller 109 of the cover 104 in the state where the cover 104 is closed. A head bracket 115 is fixed to the housing 101, and thereby biases the line thermal head 114 upward the rear side of the printer 1. The head cover 115a is mounted on the housing 101 if necessary. The head cover 115a prevents vibration by biasing the line thermal head 114.

The line thermal head 114 includes a plurality of heat generating elements 114a arranged in a line in a main scanning direction orthogonal to the sub-scanning direction. The heat generating elements 114a are heat generating elements that generate heat e.g., when an electric current flows therethrough, and each element corresponds to a pixel of one dot. The heat generating elements 114a are heated under the control of a processor 801 (a head control unit 132) (explained later), and thus the line thermal head 114 performs printing, line by line, by heating the paper PT. A temperature sensor 127 (see FIG. 3 and FIG. 4) that measures environmental temperature around the line thermal head 114, that is, temperature inside the printer 1 is provided in the vicinity of the line thermal head 114.

In addition, a connector 116 and a battery accommodating unit 117 are provided on one side surface of the housing 101. The connector 116 is a connection terminal for connecting with an external device. The battery accommodating unit 117 accommodates a battery 117a in a detachable manner (see FIG. 4) as a power source for driving. The battery 117a accommodated in the battery accommodating unit 117 is connected to a power source connector (not shown) inside the housing 101.

In addition, the housing 101 includes a display and operation unit 118. The display and operation unit 118 includes a power switch 119, a paper feed button 120 for inputting a user's instruction such as paper feeding or the like, a pause button 121 for inputting a user's instruction such as temporary stop of the paper feeding, an indicator 122 for notifying the user of a state of the battery 117a, a liquid crystal display (LCD) 123, and a communication window 124 for infrared communication.

The printer 1 performs communication of various data with the external device connected through the communication window 124 and the connector 116. For example, the printer 1 receives print data which is subjected to be printed on the paper PT from an external device through the communication of data, stores the print data in a storage unit 131 (see FIG. 4), and prints the print data on the paper PT. Here, for example, the external device is an information processing device such as a personal computer (PC), a POS terminal, a mobile phone, and a handy terminal.

Next, a printing mechanism of the printer 1 will be described with reference to FIG. 3. Here, FIG. 3 is a diagram schematically showing the printing mechanism of the printer 1.

Figure 3:
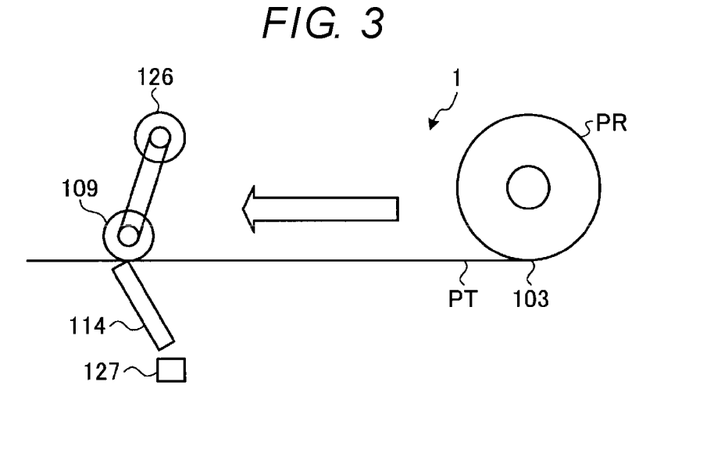
FIG. 3 is a diagram schematically showing a printing mechanism of the printer according to the embodiment.

As depicted in FIG. 3, in the printer 1, when the paper roll PR is accommodated in the paper accommodating unit 103, the paper PT is pulled out from the paper roll PR, and the cover 104 is closed, the pulled out paper PT is interposed between the platen roller 109 and the line thermal head 114 in the state where the cover 104 is closed.

In a state where the paper PT is interposed between the platen roller 109 and the line thermal head 114, the stepping motor 126 rotatably drives the platen roller 109 through the transmission 128 or the like according to control of the processor 801 (a print control unit 137) (see FIG. 4) which will be described below. With this, the paper PT is transported in the sub-scanning direction (arrow direction in FIG. 3) toward the paper discharging outlet 108 via the line thermal head 114 from the paper roll PR. In addition, the line thermal head 114 performs printing on the paper PT, which is transported in the sub-scanning direction, by generating heat from the heat generating elements 114a according to control of the processor 801 (a head control unit 132) which will be described below.

Figure 4:
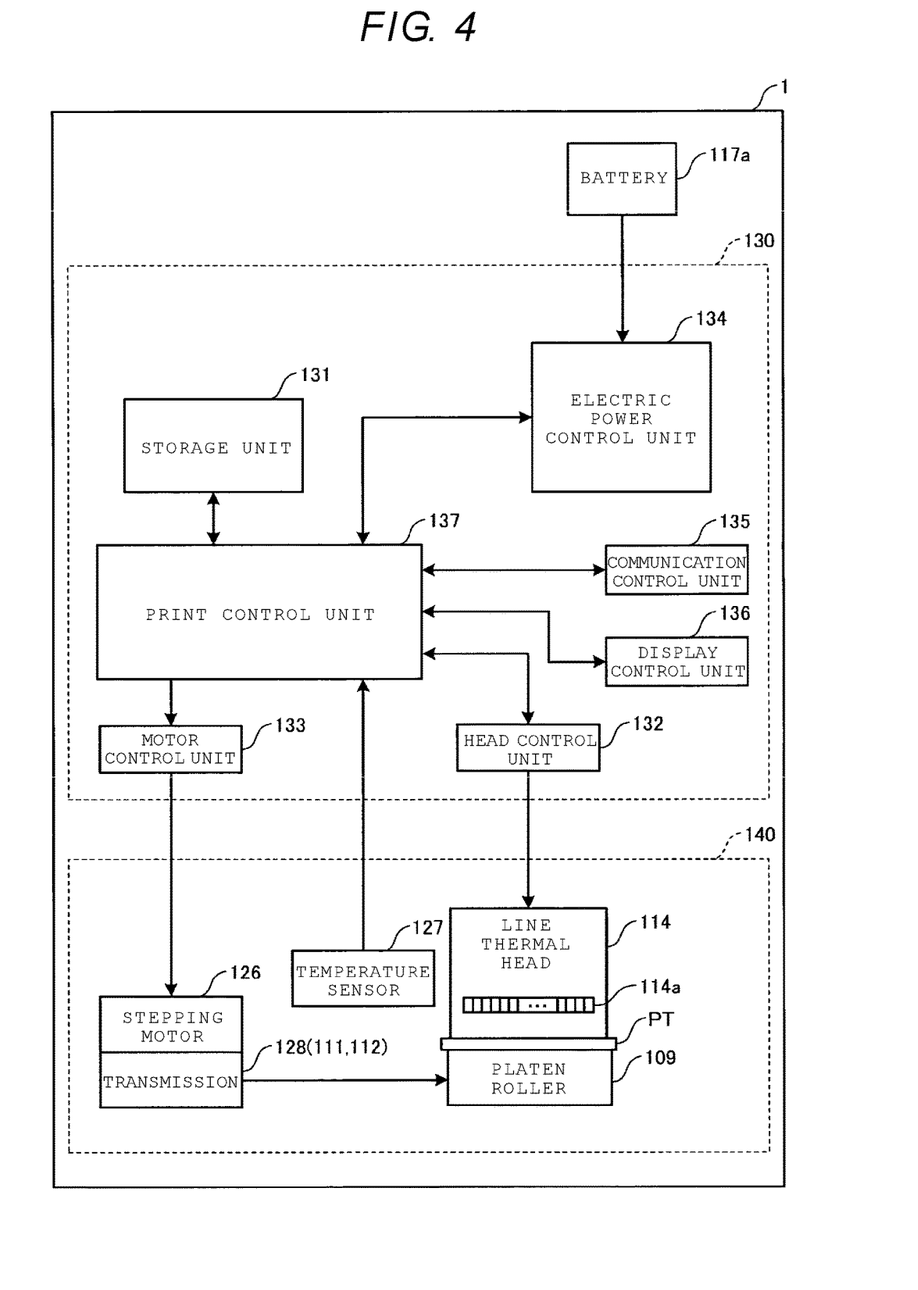
FIG. 4 is a block diagram showing a control system of the printer according to the embodiment.

Next, a control system 130 of the printer 1 will be described. FIG. 4 is a diagram showing the control system 130 of the printer 1. As described in FIGS. 1 and 4, the printer 1 includes the control system 130 including a processor 801, a read only memory (ROM) 802, a random access memory (RAM) 803, and a storage unit 131.

The processor 801 performs the operation of all of the functional units (the head control unit 132, a motor control unit 133, an electric power control unit 134, a communication control unit 135, a display control unit 136, and the print control unit 137) by executing programs or the like stored in the read only memory (ROM) 802, the random access memory (RAM) 803 or the storage unit 131. The processor 801 is, for example, a central processing unit (CPU). The storage unit 131 is, for example, a flash memory. Detailed functions of the above functional units will be explained below. Moreover, all or some of the functions of the above functional units (the head control unit 132, a motor control unit 133, an electric power control unit 134, a communication control unit 135, a display control unit 136, and the print control unit 137) can be realized by a control circuit, ASIC, programmed processor, or a combination thereof.

In addition, the printer 1 includes a printing mechanism 140 including the platen roller 109, the line thermal head 114 (heat generating elements 114a), the stepping motor 126, the temperature sensor 127, and the transmission 128 (driven gear 111 and drive gear 112) described above.

The storage unit 131 is a storage medium such as a flash memory. The storage unit 131 stores various pieces of setting information such as low temperature setting information, which will be described below, where a driving condition or the like of the printing mechanism 140 is set, in addition to the program according to control of the printer 1.

The head control unit 132 controls electric power supplied to heat generating elements 114*a* of the line thermal head 114 so as to cause a selected number of the heat generating elements 114*a* to generate the heat in accordance with the print data under the control of the print control unit 137. Here, magnitude of electric power to be supplied is proportional to the number of the heat generating elements 114*a* that actually apply heat onto the paper PT for printing.

The motor control unit 133 controls a transporting speed of the paper PT in the sub-scanning direction of the line thermal head 114 by outputting a drive pulse signal to the stepping motor 126 under the control of the print control unit 137.

The electric power control unit 134 controls turn on and turnoff operations of the electric power supplied from the battery 117*a* of the battery accommodating unit 117, according to the turn on and turn off operations of the power switch 119 of the display and operation unit 118. Specifically, the electric power control unit 134 supplies the electric power of the battery 117*a* to each unit of the printer 1, when the power switch 119 is operated as the turn on operation. In addition, the electric power control unit 134 measures a voltage level of the battery 117*a* accommodated in the battery accommodating unit 117, and notifies the print control unit 137 of a measured result thereof.

The communication control unit 135 performs communication of various data with the external device connected through the connector 116, the communication window 124, or the like by using a communication interface (not shown). For example, the communication control unit 135 receives the print data transmitted from the external device, and stores the received print data in the storage unit 131. The communication interface is, for example, infrared communication such as IrDA, USB, wireless local area network (LAN), RS-232C, Bluetooth (registered trademark), or the like.

The display control unit 136 controls contents displayed on an LCD 123 of the display and operation unit 118. For example, the contents displayed may include electric wave reception state or the like.

The print control unit 137 supervises a printing operation by the printing mechanism 140 by controlling the head control unit 132 and the motor control unit 133 based on the environmental temperature measured by the temperature sensor 127. Specifically, the print control unit 137 changes printing methods according to whether or not the environmental temperature measured by the temperature sensor 127 exceeds a predetermined threshold value (hereinafter, referred to as threshold temperature). Here, for example, the threshold temperature is a low temperature of 0° C., −15° C. or the like. It is preferable to set the threshold temperature at a temperature (low temperature) at which deterioration of printing quality may occur when printing is performed by a first printing method which will be described below. The threshold temperature may be stored in the storage unit 131.

In a case where the environmental temperature measured by the temperature sensor 127 exceeds the threshold temperature, the print control unit 137 causes the print data to be printed by the first printing method. The first printing method is a method of printing the print data at a variable printing speed, and can use the printing method in the related art. In the embodiment, as the first printing method, the method of printing the print data at the variable printing speed based on a printing coverage of each line configuring the print data will be described.

In the first printing method, the print control unit 137 calculates a printing coverage indicating a proportion of the heat generating elements 114*a* to be activated for printing among the entire heat generating elements 114*a* configuring the line thermal head 114, for each line of the print data. Accordingly, the print control unit 137 causes the print data to be printed line by line by controlling the thermal head 114 based on the calculated printing coverage for each line.

Specifically, since a large amount of energy is required for heating the heat generating elements 114*a* as the printing coverage increases, the head control unit 132 causes the heat generating elements 114*a* to be individually driven so as to generate heat in one line according to a value of the printing coverage. In the first printing method, since the number of divisions increases as the printing coverage increases, the time to activate the heat generating elements 114*a* per one line becomes longer, and thereby the transporting speed of the recording paper, that is, the printing speed decreases. It is assumed that the number of divisions of the heat generating elements 114*a* and the maximum number of the heat generating elements 114*a* which can generate heat at the same time are predetermined for each printing coverage within a range of the electric power (e.g., voltage level) supplied by the battery 117*a* in order to drive the heat generating elements 114*a*.

Meanwhile, in a case where the environmental temperature measured by the temperature sensor 127 is equal to or lower than the threshold temperature, the print control unit 137 causes the print data to be printed by using a second printing method. The second printing method is a method of printing the print data at a constant printing speed (hereinafter, referred to as low temperature printing speed). The print control unit 137 derives the low temperature printing speed by the following procedures.

First, the print control unit 137 calculates the printing coverage of each line configuring the print data, and specifies the maximum printing coverage (hereinafter, referred to as maximum printing coverage) from the calculated printing coverage. Subsequently, the print control unit 137 determines a printing speed set for a printing under low-temperature environments (hereinafter, referred to as "low temperature printing speed") when printing the print data, based on the specified maximum printing coverage and the electric power (voltage level) supplied by the battery 117*a*.

Here, the low temperature printing speed means a constant printing speed at which it is confirmed that with respect to the combination of the maximum printing coverage and the voltage level, printing under the combination condition at a low temperature equal to or lower than a threshold temperature does not deteriorate printing quality. More specifically, the low temperature printing speed means a constant printing speed at which it is confirmed that with respect to the combination of the maximum printing coverage and the voltage level, a stable operation of the stepping motor 126 is confirmed by printing under the combination condition at a low temperature equal to or lower than the threshold temperature.

The print control unit 137 determines the low temperature printing speed corresponding to a combination of the maximum printing coverage of the print data and a current voltage level while referring to setting information (hereinafter, referred to as low temperature setting information) that associates each combination condition of the maximum printing coverage and the voltage level with the low temperature printing speed corresponding to the combination condition.

For example, the low temperature setting information may be held in a form such as table data in which each combination condition of the maximum printing coverage and the voltage level and a corresponding low temperature printing speed are stored in association with each other. In addition, the low temperature setting information may be held in a form such as an arithmetic expression capable of deriving a corresponding low temperature printing speed by inputting a combination of the maximum printing coverage as a variable and the voltage level.

In addition, a driving method when printing at the low temperature printing speed is not particularly limited as long as the heat generating elements 114a of the line thermal head 114 can be driven within a range of the electric power supplied by the battery 117a. For example, the head control unit 132 may drive the heat generating elements 114a with a constant number of divisions, and may drive the heat generating elements 114a with the number of divisions in accordance with a value of the maximum printing coverage. In addition, the driving methods of the line thermal head 114 corresponding to various combination conditions of the maximum printing coverage and the voltage level may be held in the low temperature setting information in association with the various combination conditions.

Subsequently, the print control unit 137 causes each line of the print data to be printed at the low temperature printing speed by controlling the head control unit 132 and the motor control unit 133 based on the determined low temperature printing speed. As described above, in the second printing method, entire lines configuring the print data are printed at a constant printing speed set for a printing under low-temperature environments.

Figure 5:
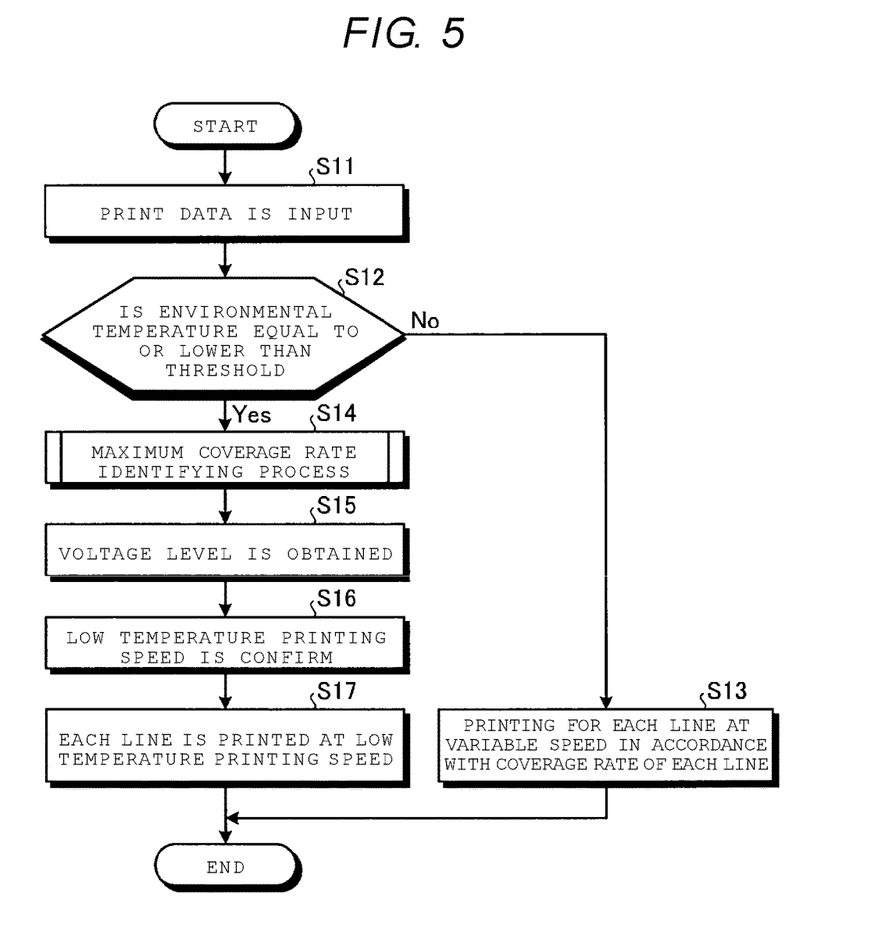
FIG. 5 is a flowchart depicting an example of a first print control process performed by the printer of the embodiment.

Next, a print control process performed by the printer 1 will be described with reference to FIG. 5. FIG. 5 is a flowchart depicting an example of a first print control process performed by the printer 1.

First, when the print data is input from the external device or the like (step S11), the print control unit 137 converts a data format of the input print data into a format which can be printed by the line thermal head 114.

Subsequently, the print control unit 137 compares the environmental temperature around the line thermal head 114 obtained from the temperature sensor 127 and a predetermined threshold temperature (step S12). Here, in a case where the environmental temperature exceeds the threshold temperature (step S12; No), the print control unit 137 performs the above-described first printing method. Specifically, the print control unit 137 causes corresponding print data for each line to be printed at a variable printing speed in accordance with the printing coverage of each line configuring the print data by controlling the head control unit 132 and the motor control unit 133 (step S13), and the process ends.

Meanwhile, in a case where the environmental temperature is equal to or lower than the threshold temperature (step S12; Yes), the print control unit 137 performs the above-described second printing method. Specifically, the print control unit 137 specifies the maximum printing coverage from the printing coverage of each line configuring the print data by performing the maximum printing coverage specifying process (step S14). Hereinafter, the maximum printing coverage specifying process of step S14 will be described with reference to FIG. 6.

Figure 6:
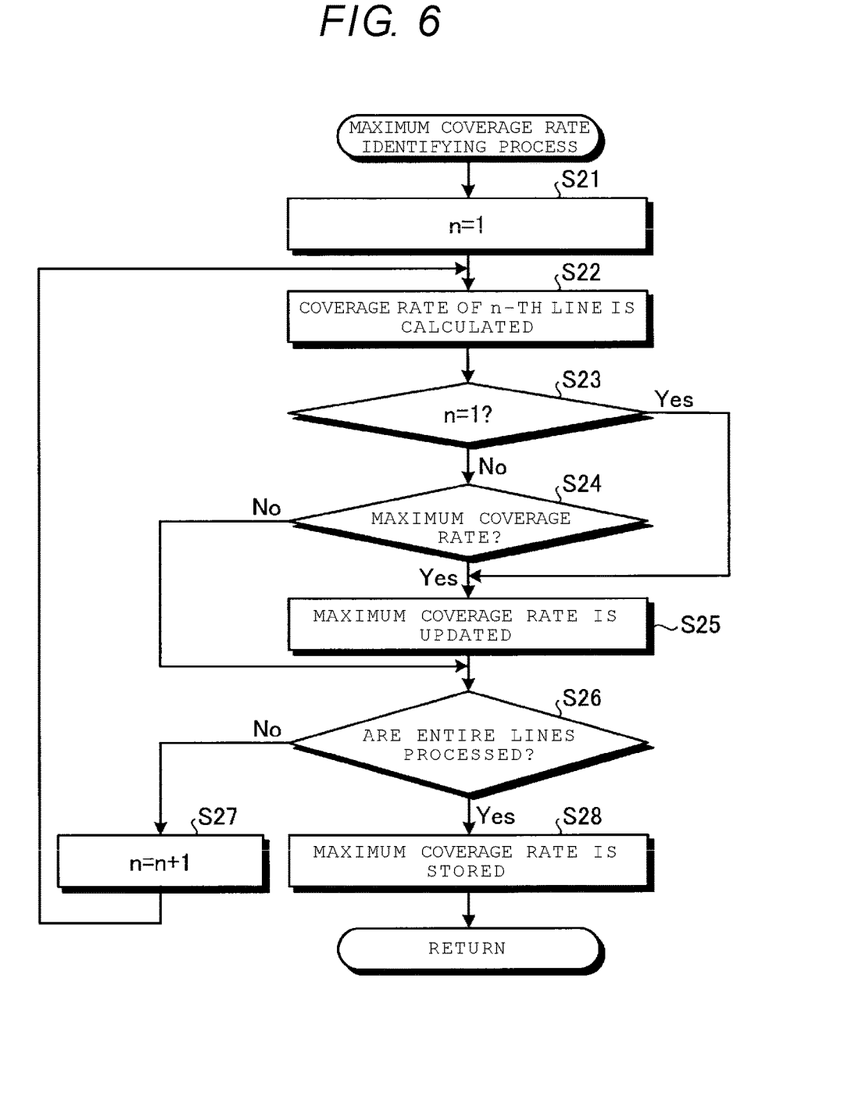
FIG. 6 is a flowchart depicting an example of a second printing process performed by the printer of the embodiment.

FIG. 6 is a flowchart depicting an example of a second printing process performed by the printer 1. First, the print control unit 137 initializes counter n as 1 for counting each line of the print data (step S21).

Subsequently, the print control unit 137 calculates the printing coverage of an n-th line (step S22). Thus, the print control unit 137 determines whether or not n is 1, that is, whether or not the printing coverage calculated at the first time is satisfied (step S23). In a case where n is 1 (step S23; Yes), the print control unit 137 proceeds to execute step S25. Meanwhile, in a case where n is not 1 (step S23; No), the print control unit 137 compares the printing coverage that is calculated in this time and the printing coverage (maximum printing coverage) that is calculated in the past time, and determines which printing coverage is greater (step S24).

In step S24, in a case where it is determined that the printing coverage that is calculated in this time is greater than or in a case where it is determined that the printing coverage that is calculated in this time is equal to the printing coverage (maximum printing coverage) that is calculated in the past time (step S24; Yes), the print control unit 137 proceeds to execute step S25. In step S25, the print control unit 137 updates the maximum printing coverage by setting the printing coverage that is calculated in this time as the maximum printing coverage (step S25), and the print control unit 137 proceeds to execute step S26.

In addition, in step S24, in a case where it is determined that the printing coverage (maximum printing coverage) that is calculated in the past time is greater than the printing coverage that is calculated in this time (step S24; No), the print control unit 137 proceeds to execute step S26.

Subsequently, the print control unit 137 determines whether or not processes of steps S22 to S25 are performed on the entire lines configuring the print data (step S26). In a case where an unprocessed line exists (step S26; No), the print control unit 137 causes the process to return to step S22 after incrementing n by 1 (step S27).

In addition, in a case where the processes on the entire lines are completed (step S26; Yes), the print control unit 137 stores a current value of the maximum printing coverage (step S28), and proceeds to execute step S15 of FIG. 5.

Returning to FIG. 5, the print control unit 137 obtains a voltage level of the battery 117a through the electric power control unit 134 (step S15). Subsequently, the print control unit 137 determines the low temperature printing speed based on the maximum printing coverage specified in step S14 and the voltage level obtained in step S15 (step S16).

Accordingly, the print control unit 137 causes each line of the print data to be printed at the low temperature printing speed (step S17) by controlling the head control unit 132 and the motor control unit 133 based on the low temperature printing speed determined in step S16, and the process ends.

As described above, the printer 1 of the embodiment specifies the maximum printing coverage from the printing coverage of each line configuring the print data in a case where the environmental temperature around the line thermal head 114 is equal to or lower than the threshold temperature. In addition, the printer 1 determines the low temperature printing speed at the time of performing printing based on the specified maximum printing coverage and a supply electric power (voltage level) of the battery 117a at a time when the maximum printing coverage is specified. Accordingly, the printer 1 prints the print data at a constant low temperature printing speed based on the determined low temperature printing speed.

With this, even in a case where the environmental temperature around the line thermal head 114 is equal to or lower than the threshold temperature, since the printer 1 can stably transport the paper PT, it is possible to improve the printing quality at the low temperature. In addition, the printer 1 can control simply and easily the printing by printing the entirety of the print data at the constant low temperature printing speed, it is possible to efficiently perform the printing control at the low temperature.

So far, while certain embodiments of the present disclosure have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, the low temperature printing speed is determined from the combination of the maximum printing coverage and the voltage level. However, the embodiment is not limited thereto. The low temperature printing speed may be determined based on the maximum printing coverage. In this case, for example, by setting a minimum value of a voltage level or the like by which the printer 1 can be operated as a reference voltage, the low temperature printing speed at which a stable operation is confirmed by the reference voltage or a low temperature equal to or lower than the threshold temperature may be determined. In this case, it is assumed that the low temperature setting information associates each condition of the maximum printing coverage and the low temperature printing speed corresponding to the condition with each other.

In addition, in the above-described embodiment, the stepping motor 126 is used as a driving power source for transporting the paper PT, but another type of a motor may be used as the driving power source.

In addition, in the embodiment, the exemplary embodiment of the present disclosure is applied to the independent printer 1. However, the embodiment is not limited thereto, and may be applied to the information processing device such as a POS terminal including the control system 130 and the printing mechanism 140 of the above-described printer 1.

In addition, the program to be executed by the printer 1 of the above-described embodiment is previously provided by being incorporated in a storage medium (ROM or storage unit 131) included in the printer 1, but the embodiment is not limited thereto. The program may be configured to be provided by being recorded in a computer readable recording medium such as a CD-ROM, a flexible disk (FD), a CD-R, and a digital versatile disk (DVD) in an installable format or executable format file. Furthermore, the storage medium is not limited to a medium independent of the computer or an embedded system, but also includes a storage medium where a program transmitted through a LAN, the Internet, or the like is downloaded thereto and stored or temporarily stored therein.

In addition, the program to be executed by the printer 1 of the above-described embodiment may be configured to be provided by being stored on a computer connected to a network such as the Internet and by being downloaded via a network, or may be configured to be provided or distributed via the network such as the Internet.

What is claimed is:

1. A battery-powered printer comprising:
a printing head that has a plurality of heat generating elements arranged along a direction orthogonal to a transport direction of a recording medium and is configured to print on the recording medium;
a temperature sensor configured to measure a temperature inside the printer; and
a processor configured to determine whether the temperature measured by the temperature sensor is equal to or lower than a predetermined threshold, determine a constant printing speed at the time of printing under a condition where the temperature is equal to or lower than the predetermined threshold, and control the printing head and a transporting speed of the recording medium so as to cause each line of the print data to be printed on the recording medium at the constant printing speed.

2. The printer according to claim 1,
wherein the processor causes each line to be printed on the recording medium at a variable printing speed in accordance with a printing coverage of the line under a condition where the temperature exceeds a predetermined threshold.

3. The printer according to claim 1, wherein
the processor is further configured to specify a maximum printing coverage from the printing coverage of each line to be printed, and determine the constant printing speed based on the specified maximum printing coverage.

4. The printer according to claim 3, further comprising:
a battery for powering the printer,
wherein the processor is further configured to measure a voltage level supplied by the battery, and
the processor determines the constant printing speed based on the specified maximum printing coverage and the measured voltage level.

5. The printer according to claim 4, further comprising:
a stepping motor that drives a transporting mechanism for transporting the recording medium,
wherein the processor determines the constant printing speed corresponding to a combination of the specified printing coverage and the measured voltage level based on setting information that associates each combination condition of the printing coverage and the measured voltage level with the constant printing speed at which a stable operation of the stepping motor has been confirmed.

6. The printer according to claim 3, wherein
the processor drives the printing head with a number of divided time periods in accordance with a value of the maximum printing coverage.

7. The printer according to claim 1, wherein
the processor drives the printing head with a constant number of divided time periods.

8. The printer according to claim 1, wherein the temperature sensor is provided in the vicinity of the printing head.

9. A POS system comprising:
a POS terminal configured to generate print data; and
a battery-powered printer including
a printing head that has a plurality of heat generating elements arranged along a direction orthogonal to a transport direction of a recording medium and is configured to print the print data received from the POS terminal on the recording medium,
a temperature sensor configured to measure a temperature inside the printer, and
a processor configured to determine whether the temperature measured by the temperature sensor is equal to or lower than a predetermined threshold, determine a constant printing speed at the time of printing the print data under a condition where the temperature is equal to or lower than the predetermined threshold, and control the printing head and a transport speed of the recording medium so as to cause each line of the print data to be printed on the recording medium at the constant printing speed.

10. The system according to claim 9,
wherein the processor causes each line of the print data to be printed on the recording medium at a variable printing speed in accordance with a printing coverage of the line under a condition where the temperature exceeds a predetermined threshold.

11. The system according to claim 9, wherein
the processor is further configured to specify a maximum printing coverage from the printing coverage of each line of the print data to be printed, and determine the constant printing speed based on the specified maximum printing coverage.

12. The system according to claim 11, wherein
the printer further includes a battery;
the processor is further configured to measure a voltage level supplied by the battery, and
the processor determines the constant printing speed based on the specified maximum printing coverage and the measured voltage level.

13. The system according to claim 12, wherein
the printer further includes a stepping motor that drives a transporting mechanism for transporting the recording medium, and
the processor determines the constant printing speed corresponding to a combination of the specified printing coverage and the measured voltage level based on setting information that associates each combination condition of the printing coverage and the measured voltage level with the constant printing speed at which a stable operation of the stepping motor has been confirmed.

14. The system according to claim 13, wherein
the processor drives the printing head with a number of divided time periods in accordance with a value of the maximum printing coverage.

15. The system according to claim 9, wherein
the processor drives the printing head with a constant number of divided time periods.

16. The system according to claim 9, wherein the temperature sensor is provided in the vicinity of the printing head.

17. A method for printing in a battery-powered printer that includes a printing head having a plurality of heat generating elements arranged along a direction orthogonal to a transport direction of the recording medium and is configured to print on the recording medium, and a temperature sensor configured to measure a temperature inside the printer, the method comprising:
determining whether the temperature measured by the temperature sensor is equal to or lower than a predetermined threshold;
determining a constant printing speed at the time of printing the print data under a condition where the temperature is equal to or lower than the predetermined threshold; and
controlling the printing head and a transport speed of the recording medium so as to cause each line of the print data to be printed on the recording medium at the constant printing speed.

18. The method according to claim 17, further comprising:
controlling the printing head and the transporting mechanism so as to cause each line to be printed on the recording medium at a variable printing speed in accordance with a printing coverage of the line under a condition where the temperature exceeds a predetermined threshold.

19. The method according to claim 17, further comprising:
specifying a maximum printing coverage from the printing coverage of each line configuring the print data, and determining the constant printing speed based on the specified maximum printing coverage.

20. The method according to claim 19, further comprising:
measuring a voltage level supplied by a battery of the printer,
wherein the constant printing speed is determined based on the specified maximum printing coverage and the measured voltage level.

* * * * *